March 9, 1965 D. K. COPELL 3,172,178
ARTICLE BINDING DEVICE
Filed June 6, 1961
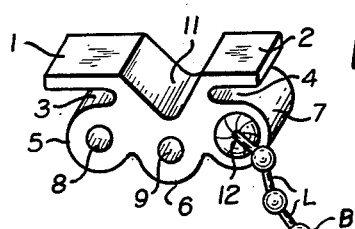
FIG. 1.
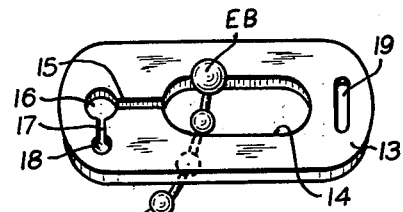
FIG. 2.
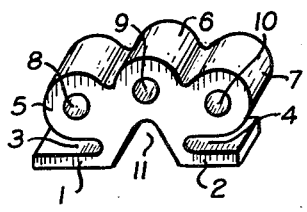
FIG. 3.
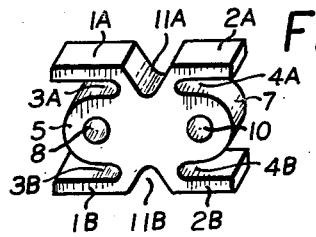
FIG. 4.
FIG. 5.
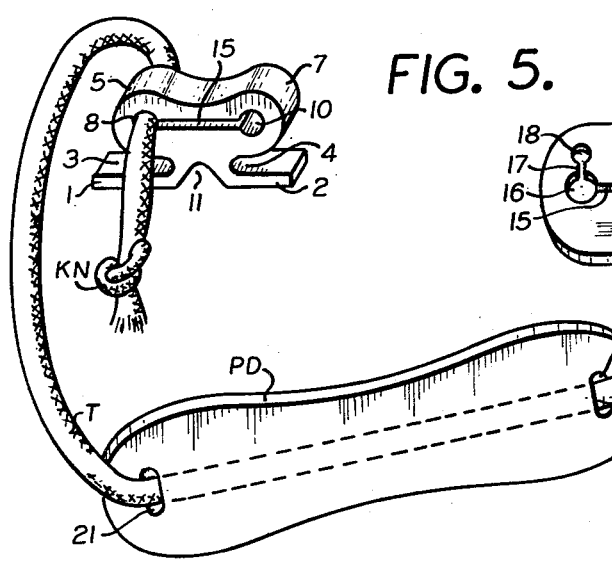
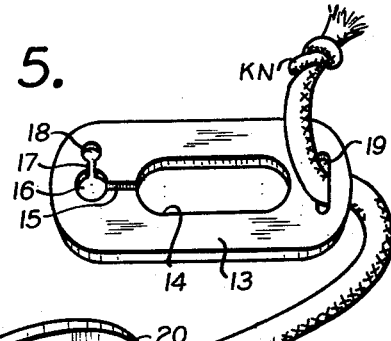
INVENTOR
DANIEL K. COPELL
BY
ATTORNEY.

United States Patent Office 3,172,178
Patented Mar. 9, 1965

3,172,178
ARTICLE BINDING DEVICE
Daniel K. Copell, New York, N.Y.
(R.D. 1, Box 192, Belmar, N.J.)
Filed June 6, 1961, Ser. No. 115,863
5 Claims. (Cl. 24—3)

This invention relates to a structurally and functionally improved fastener of pliable rubber or plastic. The general object of the invention is to provide a versatile fastener made of pliable, bendable and unbreakable material to fasten and unfasten a variety of articles easily and quickly.

Another object of the invention is to provide an unbreakable fastener made of pliable rubber or plastic that could be used as a removable button for cuffs of shirt sleeves.

These, and other objects of the invention are achieved by providing a fastener having two pliable wings spaced apart by a vertical arch and two U shaped gaps between the wings and the head of the fastener, in combination with a pliable bendable plastic or rubber disc or body having a slot that is shorter than the combined length of the wings and the vertical arched gap that separates them. The wings can be gripped, bent and pressed together to form a vertical narrow unit which is inserted into the slot of the disc or body, and when the wings are released they will flatten out horizontally and extend beyond both sides of the slot. Thus the fastener is secured to the disc or body by means of the pliable bendable wings.

Generally the invention is further embodied by providing a fastener body with pliable wings in combination with a pliable plastic disc or body having a slot with inner curved ends, and at the center of one end a slit leading to a round opening and another slit leading in another direction to a smaller round opening. The rubber fastener could be quipped with a chain consisting of small balls connected by thin links, and at one end of the chain a larger ball. This combination will make a versatile keyholder, as the length of the chain could be adjusted so that it may be worn on the wrist as a bracelet by women employees who wish to keep their locker-key while at work, and men could fasten it on their belt.

A feature of the invention resides in the provision of a rubber fastener in combination with a pliable plastic disc having a slot that could be equipped with a tape, cord, strap or chain the length of which may be adjusted to the circumference of a bundle or object to be fastened together, or used for holding securely a bandage applied to a wound, or padding applied to a broken limb that has to be removed quickly and easily in case of an emergency.

A further feature of the invention resides in the provision of a rubber fastener in combination with a pliable plastic body having a slot, and an ornamental long chain attached to the head of the fastener whereby such a combination would be a new article for the ladies, who could wear it as a necklace or as a belt.

Other important functional and structural features, objects and advantages of the invention will appear from the following detailed specification taken with the accompanying drawings and specifically pointed out in the appended claims.

In describing the invention in detail, reference will be made to the accompanying drawings, and in which:

FIG. 1 is a perspective view of the novel fastener with one end of a ball chain attached, and the other end having a larger ball than the balls of the chain, which is inserted through the slot of a pliable disc member.

FIG. 2 is a perspective view of the novel fastener interlocked with a disc member by means of the pliable wings, and two balls which cover the two round openings of the disc.

FIG. 3 is a perspective view of the novel fastener to be used as a removable unbreakable button.

FIG. 4 is a perspective view of the novel fastener showing a modification.

FIG. 5 is a perspective view of the novel fastener showing another modification, and having a tape inserted into one of the fastener openings and having the other end of the tape inserted into an opening of a pliable disc, there being between the fastener and the disc a foam rubber pad supported by a cloth tape.

In the drawings the fastener is formed with a flexible rubber or plastic body, having two pliable bendable wings as indicated by the numerals 1 and 2 spaced apart by an arch 11, wing 1 being longer than wing 2. Between the wings and the body of the fastener are two U shaped gaps 3 and 4, and the head of the fastener has three round holes 8, 9 and 10. Hole 10 is covered by the head 12 of a post on a stem inserted through the end ring of a chain which consists of a plurality of balls B connected by thin links L. At the other end of the chain is a ball EB, which is larger than the balls of the chain and is inserted into the slot 14 of disc 13.

In use the chain is moved towards the slit 15 with link L pressed against the slit 15 so that the chain will enter and be retained in opening 16. If the user desires to shorten the chain he grips the end ball EB, pulls it at a desired point at a thin link and presses same against the second slit 17, so that it will enter into the smaller round opening 18; a small ball will be retained, and then the end ball EB, is put through the slot 14 and moved with its link against the slit 15, pressing same into opening 16; thus the chain is shortened and is secured to the pliable disc 13. To connect the rubber fastener to the pliable plastic disc 13, as shown in FIG. 2, the user inserts first the short wing 2, at one end of the slot 14, than bends the second longer pliable wing 1, towards the arched gap 11, thus reducing the length of the pliable wing 1, and it is easily pressed into the second end of the slot 13. Both wings will flatten out and extend beyond both ends of the slot 14; thus the rubber fastener will stay interlocked with the disc 13, by means of the two wings 1 and 2. To detach the rubber fastener from the plastic disc 13, the user grips the head with thumb and forefinger of the right hand and then bends and presses the two wings 1 and 2, with thumb and forefinger of the left hand, toward the arched gap 11, both wings forming into a single narrow unit which is easily withdrawn from the slot 14.

FIG. 3 shows how the fastener may be used as a removable unbreakable button for cuffs or garments made with button holes as made on cuffs of shirt sleeves. The rubber fastener could be equipped with an ornament or badge to be worn in the button hole of the lapel.

FIG. 4 shows a modification of the rubber fastener, having four pliable bendable wings 1A, 2A, 1B, and 2B, which are spaced apart by two arched gaps 11A, and 11B, and four U shaped gaps 3A, 3B, 4A, and 4B formed by the four pliable wings, and the center portions 5 and 7 of the fastener having two round holes 8 and 10. This modified rubber fastener functions the same as that shown in FIGURES 1, 2, and 3, except it could be fastened to two bodies or discs having slots.

FIG. 5 shows another modification of the rubber fastener. In this embodiment, the body portions 5 and 7 are formed with two round holes 8 and 10, one larger than the other and connected by an elongate slit 15. Through the larger round hole 8, one end of a tape T is inserted and then formed into a knot KN. The other end of the tape is inserted into the opening 19 of the disc 13, and formed into a knot KN. Between the rubber fastener and the disc a foam rubber pad PD is supported by the tape T, which was inserted through the two openings 21 and 20 of the foam rubber pad. The length of the tape T, could be adjusted to the circumference of the bundle or package to be fastened, and particularly could be applied over bandaged injuries and will hold paddings placed on a broken limb, which have to be fastened and unfastened quickly and easily without a single move or jolt. To adjust the length of the tape to the circumference of the object to be fastened, the user places first the foam rubber pad PD on the object, grips the rubber fastener with his thumb and forefinger of his right hand and then holds the plastic disc with two fingers of his left hand, then inserts first the wing 1 at one end of the slot 14 of the disc 13, then with the forefinger bends the wing 2, and presses it into the other end of the slot 14. As the combined length of the wings and the arch 11 is longer than the slot 14, the wings will extend beyond both ends of the slot 14; thus the rubber fastener and the disc 13 are united by means of the wings 1 and 2. Then the user pulls at the knot KN, for adjusting the tape to the circumference of the object, then ties the end of the tape around one side of the head 5 of the rubber fastener. To unfasten the object, bundle or paddings placed on a broken limb, the user grips one end 5 of the head of the fastener, and with his thumb and forefinger bends and presses the two wings 1, and 2, together, forming a narrow unit which is easily withdrawn from the slot 14 of the disc 13.

From the foregoing description the advantages and novel features of the invention will be readily apparent.

It is to be understood that changes may be made in construction and in combination and arrangement of the several parts, provided that such changes fall within the scope of the appended claims.

What I claim is:

1. A fastening device comprising: a body portion of uniform cross-section as viewed in a plane transverse to the shortest axis of the body portion, and formed of a flexible material, said body portion having apertures extending therethrough; a plurality of wings secured to said body portion and spaced from said body portion by gaps, said wings having opposed end surfaces coplanar with the opposed end surface planes of said body portion which end planes are transverse to the shortest axis of the body portion; and a wing separating arch between said wings and having an apex extending partly into said body portion; a flexible elongate member secured to one of the apertures of said body portion; an enlarged part on an end of said elongate member; a disc having a first aperture larger than a cross section through the gaps between the wings and body portion of said fastening member, and having a second aperture within which said elongate member may be engaged, said second aperture being spaced from said first aperture and of an area smaller than the diametral cross-sectional area through said enlarged part, the second aperture being joined to the first aperture by a slit in said disc; whereby the ends of said elongate member may be conjoined by engaging the elongate member in said second aperture, and arranging said disc in the gaps of said fastening member.

2. A fastening device as in claim 1 in which said flexible elongate member comprises: a chain; and said enlarged part comprises a ball at the end of said chain.

3. A fastening device as in claim 1 in which said flexible elongate member comprises: a tape having a knot at one end thereof as said enlarged part.

4. A fastening device comprising: a body portion of uniform cross-section as viewed in a plane transverse to the shortest axis of the body portion, and formed of a flexible material, said body portion having apertures extending therethrough; a plurality of wings secured to said body portion and spaced from said body portion by gaps, said wings having opposed end surfaces coplanar with the opposed end surface planes of said body portion which end planes are transverse to the shortest axis of the body portion; and a wing separating arch between said wings and having an apex extending partly into said body portion; said plurality of wings comprising: a first pair of wings on one side of said body portion; and a second pair of wings separated by an arch on another side of said body portion.

5. A combination support and fastener comprising a one piece smooth flat flexible body having spaced apertures at its center and at both sides of the body; opposed U shaped gaps and a U shaped arch between the U shaped gaps, said gaps forming two tension creating spaces; and in continuity two wings formed integral with the body, said wings having opposed ends flush with the opposed ends of the body, the wings yielding only when manipulated to permit fastening to or unfastening from a slot or round hole.

References Cited in the file of this patent

UNITED STATES PATENTS

| | | |
|---|---|---|
| 329,754 | March | Nov. 3, 1885 |
| 829,837 | Brisacher | Aug. 28, 1906 |
| 1,042,875 | Bishop | Oct. 29, 1912 |
| 1,521,619 | Hass | Jan. 6, 1925 |
| 2,585,438 | Clingman | Feb. 12, 1952 |
| 2,909,957 | Rapata | Oct. 27, 1959 |
| 2,969,570 | Petri et al. | Jan. 31, 1961 |

FOREIGN PATENTS

| | | |
|---|---|---|
| 1,162,147 | France | Apr. 8, 1958 |
| 1,235,280 | France | May 23, 1960 |
| 9,550 | Germany | Apr. 16, 1880 |